(12) United States Patent
Souders

(10) Patent No.: US 10,214,170 B2
(45) Date of Patent: Feb. 26, 2019

(54) SEATBELT MOUNTED COMBINATION CUTTER AND GLASS BREAK TOOL

(71) Applicant: Stephen P. Souders, Lenhartsville, PA (US)

(72) Inventor: Stephen P. Souders, Lenhartsville, PA (US)

( * ) Notice: Subject to any disclaimer, the term of this patent is extended or adjusted under 35 U.S.C. 154(b) by 0 days.

(21) Appl. No.: 15/608,615

(22) Filed: May 30, 2017

(65) Prior Publication Data

US 2018/0345892 A1 Dec. 6, 2018

(51) Int. Cl.
| | |
|---|---|
| *B60B 21/00* | (2006.01) |
| *B26B 13/22* | (2006.01) |
| *B60R 21/00* | (2006.01) |
| *B60R 22/32* | (2006.01) |
| *B63C 9/00* | (2006.01) |
| *A62B 3/00* | (2006.01) |

(52) U.S. Cl.
CPC .............. *B60R 21/00* (2013.01); *A62B 3/005* (2013.01); *B60R 22/32* (2013.01); *B63C 9/00* (2013.01); *B26B 13/22* (2013.01); *B60R 2021/0016* (2013.01); *B60R 2022/328* (2013.01)

(58) Field of Classification Search
CPC ................ B60R 21/00; B60R 21/2232; B60R 2021/0016; B60R 2022/328; B63C 9/00; A62B 3/005; B26B 13/22
See application file for complete search history.

(56) References Cited

U.S. PATENT DOCUMENTS

| | | | | |
|---|---|---|---|---|
| 4,009,905 A | * | 3/1977 | Bejeannin | B60R 22/32 244/122 B |
| 4,680,861 A | | 7/1987 | Meurer | |
| 4,815,211 A | | 3/1989 | Garcia | |
| 5,085,449 A | | 2/1992 | Hudson | |
| 5,395,136 A | * | 3/1995 | Buchner | B60R 22/32 280/801.1 |
| 5,588,212 A | * | 12/1996 | Riihimaki | B60R 22/32 30/123 |
| 5,630,242 A | * | 5/1997 | Oginaezawa | B26B 27/00 30/294 |
| 5,653,031 A | * | 8/1997 | Richter | B26B 27/00 30/280 |
| 5,657,543 A | * | 8/1997 | Collins | A62B 3/005 30/123 |
| 5,903,942 A | | 5/1999 | Hasegawa | |
| 5,918,372 A | | 7/1999 | Mateme | |
| 7,028,874 B2 | * | 4/2006 | Lin | A62B 3/005 173/202 |

(Continued)

FOREIGN PATENT DOCUMENTS

DE 33 07 247 A1 * 9/1984
DE 10 2009 015 459 B3 * 5/2010

*Primary Examiner* — Hwei C Payer
(74) *Attorney, Agent, or Firm* — Sanford J. Piltch

(57) ABSTRACT

A combination seat belt restraint system cutter and glass break tool mounted onto and around the seat belt of an automotive vehicle at a predetermined position for use in cutting the web of the seat belt in the event of a seat belt release latch jam or inoperability resulting in the severing of the seat belt at said position resulting in the tool being freed for use in breaking the glass of a window of the vehicle. The combination tool also being maintained in a fixed position adjacent the safety belt extension/retraction aperture by a strap.

4 Claims, 5 Drawing Sheets

(56) References Cited

U.S. PATENT DOCUMENTS

| | | |
|---|---|---|
| 7,051,391 B2 | 5/2006 | Wang |
| D595,105 S | 6/2009 | White |
| 7,557,720 B2 | 7/2009 | Rubin |
| 8,015,643 B2 * | 9/2011 | White .................... A62B 3/005 7/144 |
| 8,146,192 B2 | 4/2012 | McGlynn |
| D732,369 S | 6/2015 | Rubin |
| 9,254,560 B2 * | 2/2016 | Rubin .................... B25F 1/006 |
| 9,265,976 B1 | 2/2016 | Hensley |
| 9,375,589 B1 * | 6/2016 | Goodman ............. A62B 3/005 |
| 9,409,043 B2 * | 8/2016 | Franken ................ A62B 3/005 |
| 9,925,952 B2 * | 3/2018 | Flegar .................... B60R 22/32 |
| 9,969,352 B2 * | 5/2018 | Noguera ................ A62B 3/005 |
| 2008/0222900 A1 | 9/2008 | Lee |
| 2014/0157525 A1 * | 6/2014 | Locklear ................ B60R 22/32 7/158 |
| 2015/0033562 A1 * | 2/2015 | Posey .................... B60R 22/32 30/164 |
| 2017/0158164 A1 * | 6/2017 | Crouch ................. A62B 3/005 |

* cited by examiner

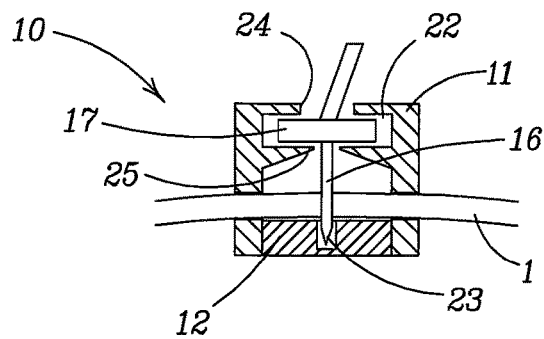
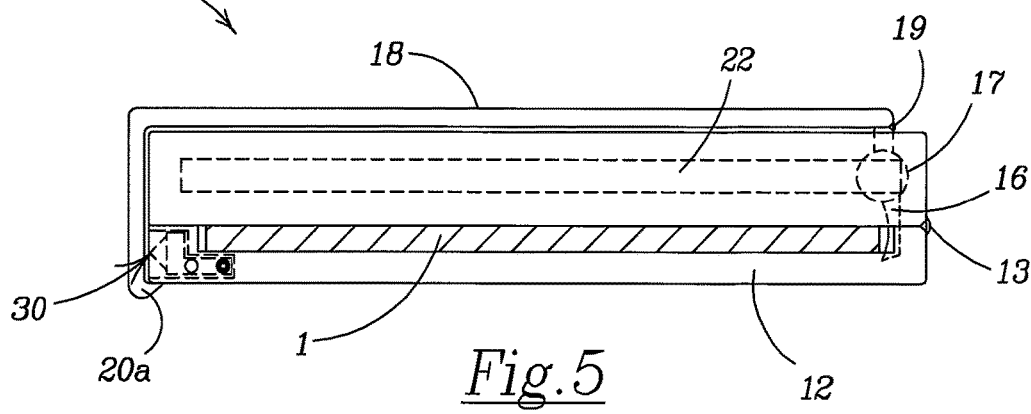
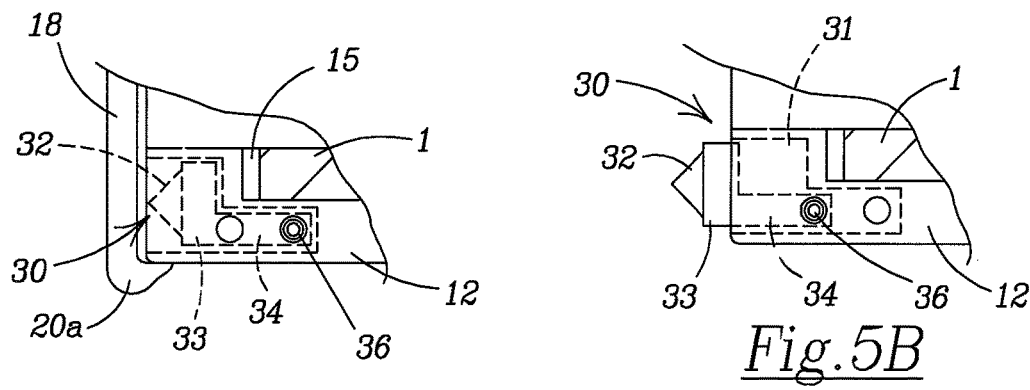
Fig.5A
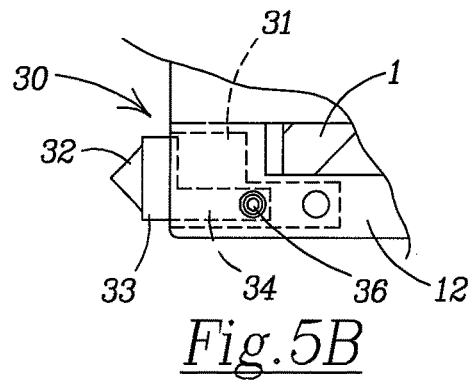
Fig.5B
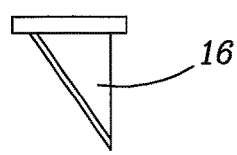
Fig.6A
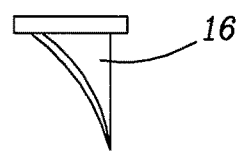
Fig.6B
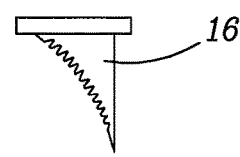
Fig.6C

SEATBELT MOUNTED COMBINATION CUTTER AND GLASS BREAK TOOL

BACKGROUND OF THE INVENTION

Seatbelts have been a common means of preventing serious injury in automobile accidents by restraining occupants in their seats since their first introduction in the late 1950s and early 1960s. More recently advances in seatbelt pretensioning systems have created a number of problems in releasing the seatbelt once an accident has occurred and the pretensioning system has been deployed.

Seatbelt pretensioners have been installed in vehicles for many years and are one of the methods used to enhance the occupant restraint system performance. Although the first systems were installed in vehicles in the late 1970s, pretensioners for seatbelts did not become popular across all makes and models until the late 1990s. Pretensioners are designed to remove any slack in the seatbelt shoulder harness assembly substantially simultaneously with the moment of a collision. The pretensioners will typically be provided on three-point seatbelts for both front-seat occupants and can be placed on the outboard rear-seats, or all three rear-seat positions. For the pretensioner to be effective the seatbelt must be a three-point harness system, not merely a lap belt design.

The more aggressive pretensioner systems will pull the occupant back into their seat simultaneously as it deploys. By maintaining the occupant securely in his/her seat and within the seatbelt restraint system, the occupant will experience a smoother deceleration. Also, the front and side airbags can deploy more effectively with less chance of causing injury to the seated and restrained occupant.

Pretensioners can be located at the buckle or anchor end of a seatbelt shoulder harness assembly and work by lowering the seatbelt buckle downward toward the vehicle floor during the collision. This type of unit may be completely concealed within the seat structure or may be visible along the outboard edge of the seat frame. Alternatively, pretensioners can also be commonly found attached directly to the retractor or take-up spool end of the seatbelt system located in the vehicle doorpost or sidewall. This design essentially spins the take-up spool backward during the crash, pulling excess slack out of the seatbelt and shoulder harness assembly. It is also possible for two pretensioners to be provided on each seatbelt, one located at each end of the seatbelt system.

There are mechanically activated pretensioner designs that do not use electricity to activate, although these are not common. There are also pretensioners that are fired by an electrical signal during a crash, but work completely mechanically by releasing a pre-stressed spring. The large majority of seatbelt pretensioners that are in use today are connected to the airbag wiring circuit. When activated, the pretensioners fire off a small pyrotechnic charge of nitrocellulose that burns rapidly in a small, enclosed chamber. This mini-explosion causes either a plug to move up a tube as it pulls the seatbelt buckle downward, or a sprocket to spin the seatbelt retractor backward. Both actions cause the seatbelt to retract, removing any slack in the seatbelt restraint system. The newest pretensioner systems combine an electrical pretensioning mechanism as well as a pyrotechnic charge. These "smart" systems use information from on-board components such as the vehicle's forward-looking radar, inertia sensors, braking systems or speed monitors to provide full deployment in the event of a crash or an adjustable, partial pretensioning grip that is released if no collision event occurs, e.g., after a sensed hard braking.

There are no visible identifiers for seatbelt pretensioners. It is fair to assume they are in use on at least all front-seat three-point seatbelt systems. Outboard, rear three-point harness systems may also have pretensioners. An accordion-type sleeve, directly below the buckle end of a seatbelt, is a very good indicator that a pretensioner is present at the lower end of the buckle. If deployed during a collision, the seatbelt buckle may be at or even below the top of the seat cushion making access to the seatbelt release button difficult or not possible if the release mechanism is drawn downward into or next to the seat such that it becomes unreachable by the occupant. The accordion sleeve will most likely appear compressed if the pretensioner system has fired.

In the normal course of the day, a seatbelt is easily removed by pressing the seatbelt release button beside the latch mechanism to release the belt so that it can retract normally. If the latch's mechanism has been damaged or destroyed, or the belt is so taut that the latch mechanism will not function properly, or if the release can't be reached based on the car's condition or the position of the occupant as a result of an accident, the occupant may be may be hanging upside down or laying sideways, then that same seatbelt that initially prevented the occupant from being horrifically injured or killed might become an extreme liability to the wellbeing of the occupant. If the seatbelt is unable to be released, or fails to release, or the occupant cannot reach the seatbelt release, the failure of the seatbelt to properly release keeps the occupant restrained in the vehicle that may be at risk of fire, flooding, or being struck by other motor vehicles.

In the event that the latch for the seatbelt system fails to release or the release mechanism is unreachable or positioned where it is inaccessible by the occupant the only remedy is to cut through the seatbelt webbing. This will require a seatbelt system escape tool to provide a means for cutting through the seatbelt. Any good car escape tool will have an easily accessible razor blade that is safely recessed into its handle and positioned at an angle to easily slice through a seatbelt.

However, the problem arises in regard to where to position or store the escape tool so that it will be easily retrievable after an accident and/or the seatbelt latch becomes inoperable. Following an accident an escape tool clipped to the visor may have been dislodged and fallen out of the reach of the occupant with the inoperable latch mechanism. Or, the escape tool stored in any of several storage compartments in the vehicle may not be reachable by the restrained occupant to be retrieved and used to cut through the seatbelt. It is, therefore, an object of the present invention to position the seatbelt escape tool directly onto the seatbelt so as to not require retrieval and to be functional at all times.

The second crucial feature of a car escape tool is a glass breaker. The glass breakers used in hand-held tools are essentially hammerheads made from steel that come to a point which can concentrate the force of your swing. Used properly, a glass breaker will shatter a side window of a vehicle. One should not even attempt breaking the windshield, as this glass is treated specifically to avoid shattering. Cutting through the seatbelt webbing and shattering a side window will allow an occupant to exit the vehicle using the window should the door have been rendered inoperable as a result of an accident.

There are a number of combination seatbelt cutters and glass breaking tools available in the market today. But if the seatbelt escape tool is unable to be retrieved to enable the cutting of the seatbelt, the combined glass breaker will also be unable to be retrieved and used as well. It is also an object of the present invention to combine the glass breaker tool with the seatbelt cutter that is to be positioned onto the seatbelt so that the combination escape tool is instantly usable with the occupant not finding it necessary to locate the escape tool in order to be able to use it to escape by cutting the seatbelt.

Other objects will appear hereinafter.

SUMMARY OF THE INVENTION

A combination cutter and glass break tool for an automotive vehicle is described as being permanently positioned in any desired location onto a vehicle safety restraint belt. The combination tool has a housing including first and second sections. The first or lower section has a recess dimensioned to permit a vehicle safety restraint system belt to be positioned therein. The second or upper section is connected to the lower section at a rear portion of both the first and second sections by a flexible hinge. Both of the two sections are fixedly joinable together at their respective front portions to capture the safety belt between the two sections and frictionally maintain the position of the tool on the captured portion of the safety belt. The combined tool also is described as having a position locking mechanism between the respective front portions of both the first and second sections of the combination tool that retains the two sections in juxtaposed contact once engaged.

The second section houses a cutting implement and cutting guide for severing the safety belt captured between the two sections. The cutting guide is located within a guide track for maintaining the cutting guide and associated cutting implement in substantially perpendicular alignment to the captured safety belt. The guide track extends within the second or upper section from the rear to the front and has both upwardly and downwardly opening slots. The downwardly opening slot permits the forward sliding of the cutting implement and the upwardly opening slot permits the attachment of the cutting guide to a handle for operating the cutting implement attached to the cutting guide.

The handle is attached to the cutting guide by a second flexible hinge located between the handle and the cutting guide that permits the handle to move from a stowed to an operational position. The handle is maintained in the stowed position by a retaining means. The retaining means for maintaining the handle in the stowed position may be a mating protrusion and dimple located on the inside surface of the handle and the front surface of the second or upper section, respectively. Alternatively the retaining means for maintaining the handle in the stowed position may be an extension clip located at the distal end of the handle that overlies the front surface of the second or upper section and extends slightly rearward along the bottom of the first or lower section of the combined tool.

The first or lower section also houses a glass break tool that can be in a stowed first position or a second deployed position. Each position is dependent upon the position of the glass break tool position locking means. The glass break tool position locking means is described as an outward spring force and rearward and forward locking positions with a depressible release button and connecting track for moving the glass break tool between the two locking positions, stowed and deployed.

A second embodiment of the combination cutter and glass break tool for an automotive vehicle is also described having a housing with of first and second side sections, a bottom section and a handle section. The first and second sections are capable of attaching to each other creating a recess dimensioned to permit a vehicle safety restraint system belt be positioned between the bottom of the attached first and second sections and the bottom section and to frictionally maintain the position of the combination tool at the point of capture of that portion of the safety belt.

The handle section is connected at a rear portion of both the first and second sections by a pin extending through the handle section and captured by both the first and second sections. The handle section is also connected to the cutting guide by the same pin extending through the cutting guide with the pin permitting the handle section to move from a stowed to an operational position. The handle is maintained in its stowed position by a retaining means.

The first and second sections house in an elongated space created between the attached first and second sections a cutting implement and cutting guide for severing the safety belt captured between the first, second and bottom sections. The cutting guide is located within a guiding track for maintaining the cutting guide and associated cutting implement in substantially perpendicular alignment to the captured safety belt. The guiding track extends within the elongated space between the first and second sections from rear to front and having both upwardly and downwardly opening slots. The downwardly opening slot permits the forward sliding of the cutting implement and the upwardly opening slot permits the attachment of the cutting guide to the handle section for operating the cutting implement attached to the cutting guide.

The cutting guide is capable of being stowed in a first position or in a second deployed position as controlled by the handle section and also houses a glass break tool on its forward facing portion. The position of the glass break tool is dependent upon the position of the cutting guide, with the glass break tool in its deployed position only following the severing of the safety belt by the cutting implement and with the handle section overlying the first and second sections forming a gripping position for the combination tool.

The retaining means for maintaining the handle section of the combination cutter and glass break tool in the stowed position may be described as a mating recess and bar located on the inside surface of the handle and inside the front of the attached first and second sections, respectively. The combination tool also has a tamper indicator in the form of a tab extending over the handle section from either the first or the second section that, when broken or missing, indicates that the combination tool may have been used.

The combination cutter and glass break tool additionally has a strap extending between the combination tool and a surface proximate to an aperture for guiding the extension and retraction of the safety belt of the vehicle. The strap is for maintaining the combination tool at a location adjacent to the aperture for guiding the extension and retraction of the safety belt and out of reach of curious children. Thus, the combination cutter and glass break tool is readily available for use by being retained in position on the safety belt system of a vehicle.

Based upon the description contained herein, the combination cutter and glass break tool will be readily available for use by the occupant of the vehicle as it will be retained in position on the safety belt system of the vehicle until needed.

BRIEF DESCRIPTION OF THE DRAWINGS

For the purpose of illustrating the invention, there are shown in the drawings forms which are presently preferred;

it being understood, however, that the invention is not limited to the precise arrangements and instrumentalities shown.

FIG. 4 is an alternative guide track and cutting implement for the combined seatbelt cutter and glass break tool of the present invention.

FIG. 5 is a partial cutaway side view of the combined seatbelt cutter and glass break tool of the present invention showing the glass break tool in its stored position.

FIG. 5A is an enlarged view of the stored glass break tool of the combined seatbelt cutter and glass break tool of the present invention.

FIG. 5B is an enlarged view of the deployed glass break tool of the combined seatbelt cutter and glass break tool of the present invention.

FIG. 6A is a first alternative cutting edge shape for the cutting implement of the combined seatbelt cutter and glass break tool of the present invention.

FIG. 6B is a second alternative cutting edge shape for the cutting implement of the combined seatbelt cutter and glass break tool of the present invention.

FIG. 6C is a third alternative cutting edge shape for the cutting implement of the combined seatbelt cutter and glass break tool of the present invention.

DETAILED DESCRIPTION OF THE PREFERRED EMBODIMENTS

The following detailed description is of the best presently contemplated mode of carrying out the invention. The description is not intended in a limiting sense, and is made solely for the purpose of illustrating the general principles of the invention. The various features and advantages of the present invention may be more readily understood with reference to the following detailed description taken in conjunction with the accompanying drawings.

Figure 1:
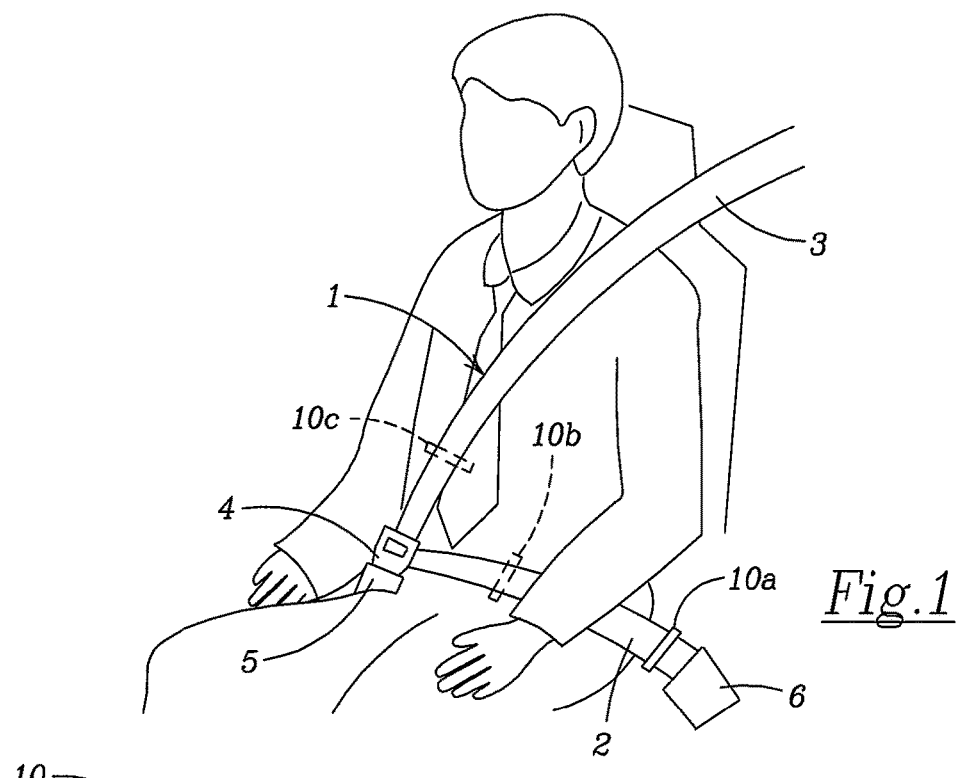
FIG. 1 is a perspective view of a vehicle occupant seated on a vehicle seat with the combined lap and shoulder harness belts deployed across the occupant's body with the combined seatbelt cutter and glass break tool of the present invention positioned onto the belt system in three possible locations.

Referring now to the drawings in detail, where like numerals refer to like parts or elements, there is shown the combined seatbelt cutter and glass break tool 10 of the present invention. In FIG. 1 the seatbelt restraint system 1 is shown restraining an occupant in a vehicle seat comprised of a lap belt portion 2, a shoulder belt portion 3, a buckle 4, and a latch mechanism 5. The lap belt portion 2 and shoulder belt portion 3 are configured as part of the same unitary safety belt restraint system that passes through the buckle 4 between a securing point (not shown) clamping the lap belt portion 2 to the vehicle floor and a seatbelt tensioner (not shown) for retracting the shoulder belt portion 3 located in the vehicle sidewall usually above and adjacent to and slightly behind the vehicle seat.

The combined seatbelt cutter and glass break tool 10 may be located in any number of locations along the seat belt system 1. Three possible locations are shown in FIG. 1. The first location 10*a* for the combined seatbelt cutter and glass break tool 10 is proximate to the sleeve 6 for guiding the lap belt portion 2 to the floor clamp for securing that end of the seat belt system 1 to the floor of the vehicle outboard of the seat. A second location 10*b* for the combined seatbelt cutter and glass break tool 10 is shown in dashed lines approximately midway across the lap belt portion 2 of the seat belt system 1. A third location 10*c* for the combined seatbelt cutter and glass break tool 10 is shown in dashed lines approximately midway along the length of the shoulder portion 3 of the seat belt system 1 that extends across the body of the occupant upwards from the buckle 4 and latch 5. Each of these possible locations of the combined seatbelt cutter and glass break tool 10 is for both comfort and ease of use by the occupant in the event that the latch 5 malfunctions and the web of the seat belt system 1 must be severed for the occupant to exit the vehicle.

Figure 2:
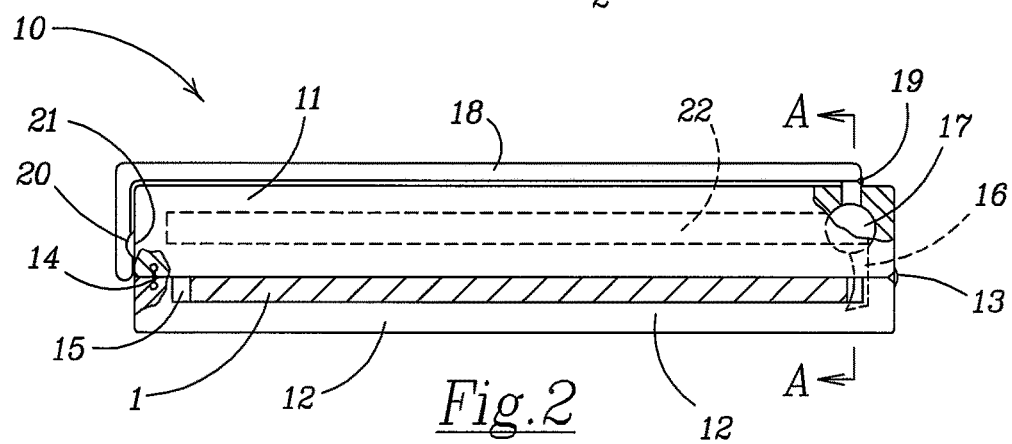
FIG. 2 is a side view of the combined seatbelt cutter and glass break tool of the present invention positioned onto the seatbelt system in any of the three possible locations.

Referring now to FIG. 2, the combined seatbelt cutter and glass break tool 10 is shown mounted onto and around the seat belt 1. This mounting is accomplished by placing the seat belt 1 between an upper portion 11 and a lower portion 12 of the combined tool 10 that are separated by a flexible hinge 13 located at one end of the combined tool 10. At the other end of the combined tool 10 there is a snap lock mechanism 14 that will retain the two portions 11, 12 of the combined tool 10 together once engaged. The snap lock mechanism 14 can be any device or apparatus that can be engaged by inserting an extended piece located on one portion 12 of the combined tool 10 into a cooperating opposing receiver located on the other portion 11 of the combined tool 10 to operatively engage one with the other to retain the two portions 11, 12 in immediate adjacent proximity of one to the other. One example of such a snap lock mechanism is an appendage extending outward from the lower portion 12 of the combined tool 10 having a bulbous distal end for insertion into and engagement with a cooperating recess in the upper portion 11 of the combined tool 10 having a shape that fully mates with the appendage and bulbous end for engaging with the entire length of the appendage so as to capture all of the appendage with its bulbous end within the cooperating recess and retain the entire appendage within the recess holding the two portions 11, 12 of the combined tool 10 together in a substantially parallel alignment. This engaging of the appendage within the cooperating recess results in the seat belt 1 being surrounded and captured within the two portions 11, 12 of the combined tool 10. The lower portion 12 has a recess 15 having a depth substantially the same as the thickness of the seat belt 1 for capturing the seat belt 1 between the bottom of the recess 15 and the inside surface of the upper portion 11. The closure of the two portions 11, 12 together creates sufficient frictional contact of the combined tool 10 against the seat belt 1 to maintain the combined tool 10 in the desired position along the belt 1.

Once engaged around the seat belt 1 the combined tool 10 is still capable of being positioned into a desired location along the belt 1. However, once the upper and lower portions 11, 12 of the combined tool 10 are in engaged juxtaposition there is considerable friction between the inside surfaces of the upper and lower portions 11, 12 of the combined tool 10 and the seat belt 1. Although there is frictional contact, the combined tool 10 is still capable of being repositioned along the portion of the seat belt 1 onto which it was placed such that the combined tool 10 can be located or relocated into a comfortable position for use by the occupant as needed.

The upper portion 11 of the combined tool 10 houses the cutting implement 16 that is attached to a cutting guide 17. The cutting guide 17, in turn, is attached to a handle 18 that can be best described as having three portions, a base portion, a gripping portion and a latch portion. The base portion of the handle 18 is attached to the cutting guide 17 at one end and to a flexible hinge 19 at the other end. The flexible hinge 19 joins together the base and gripping portions of the handle 18 such that the gripping portion of the handle can be positioned at approximately a 90° position to the outer surface of the upper portion 11 of the combined tool 10. The handle 18 is retained in a stowed position by a dimple 20 at the distal end of the latch portion of the handle 18 that is configured to overlie and engage with a cooperating rounded protrusion or bump 21 located on the front of the upper portion 11 of the combined tool 10. The latch portion of the handle 18 is positioned at a 90° angle to the gripping portion of the handle 18 to overlap the top and partial front of the combined tool 10. Engagement of the protrusion 21 with the dimple 20 maintains the handle 18 in the stowed position until pulled outward and upward for use in cutting through the web of the seat belt 1 by the cutting implement 16.

Figure 3:
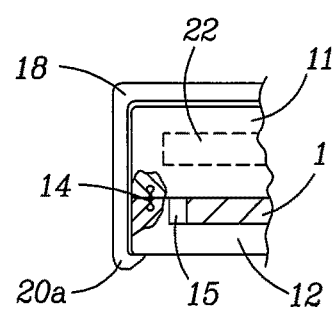
FIG. 3 is an enlarged view of an alternative latching mechanism for securing the combined seatbelt cutter and glass break tool of the present invention to the seatbelt system.

An alternative engaging mechanism for the latching portion of the handle 18 is shown in FIG. 3. The latching portion of the handle 18 is extended downward along the front of both the upper and the lower portions 11, 12 of the combined tool 10 with an extended inward facing catch 20a that clips over the junction of the front and bottom faces of the lower portion 12 of the combined tool 10. This engagement of the latch portion of the handle 18 also causes the handle 18 to be retained in the stowed position until pulled outward and upward for use in cutting through the web of the seat belt 1 by the cutting implement 16.

Figure 2A:
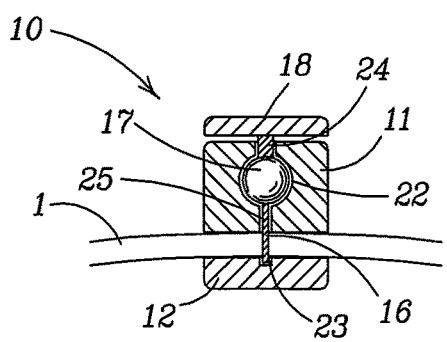
FIG. 2A is a sectional view along Line A-A of FIG. 2 showing the guide track and cutting implement of the combined seatbelt cutter and glass break tool of the present invention.

Also housed within the upper portion 11 of the combined tool 10 is the cutting implement 16. The cutting implement 16 is stored at the rear of the combined tool 10 within a recess that serves as a guide path 22 for moving the cutting implement 16 from the rear to the front of the combined tool 10 along a predetermined pathway, which movement results in the cutting through of the web of the seat belt 1. The recess or guide path 22 extends from the rear to the front of the upper portion 11 of the combined tool 10 and houses both the cutting guide 17 and the attached cutting implement 16 as is shown in FIGS. 2, 2A and 4. In each of the various depictions of the cutting implement 16, the cutting edge 23 is always housed within the guide path 22 of the combined tool 10 and remains completely unexposed to the exterior of the combined tool 10 once engaged onto the seat belt 1.

The recess or guide path 22 may take on a number of different configurations to allow the forward movement of the cutting implement 16. One such configuration of the guide path 22 is depicted in FIG. 2A. In this configuration the guide path 22 has a round upper portion to accommodate a spherical cutting guide 17 and a rectangular lower section to accommodate the thin cutting implement 16. The cutting guide 17 is connected to the handle 18 through an elongated slot 24 position along the length of the upper portion 11 such that the handle 18 can be manipulated to pull the cutting guide 17 and cutting implement 16 through the web of the seat belt 1. Connecting the guide path 22 with the recess 15 is an elongated slot 25 extending from the rear to the front of the upper portion 11 of the combined tool 10. Extending through the elongated slot 25 is the attached cutting implement 16. There is also a guide path extension 23 of the guide path 22 in the lower portion 12 of the combined tool 10 that is used maintain the distal end of the cutting implement 16 in a straight orientation regardless of forces exerted against the cutting implement 16 by the seat belt 1 or other external forces. The guide path extension 23 is directly beneath, aligned with, and coextensive to the lower portion of the guide path 22. The dimensional tolerances or clearance distances between the walls of the guide path 22 and the exterior surfaces of the cutting guide 17 and cutting implement 16 are relatively small to allow for ease of movement and to also maintain the predetermined and desired pathway of the cutting implement 16 perpendicularly to the edge of and across the web of the seat belt 1. These small dimensional tolerances result in a more accurate cut across the belt along the shortest possible distance.

Another configuration of the guide path 22 is depicted in FIG. 4. In this alternative configuration the guide path 22 has a rectangular upper portion to accommodate a similar rectangular cutting guide 17. The cutting guide 17 is connected to the handle 18 through an elongated slot 24 position along the length of the upper portion 11 such that the handle 18 can be manipulated to pull the cutting guide 17 and cutting implement 16 through the web of the seat belt 1. Immediately below the rectangular upper portion is an open lower section to accommodate the cutting implement 16. Connecting the guide path 22 with the open lower section is an elongated slot 25 extending from the rear to the front of the upper portion 11 of the combined tool 10. Extending through the elongated slot 25 is the attached cutting implement 16. There is also a guide path extension 23 of the guide path 22 in the lower portion 12 of the combined tool 10 that is similarly used maintain the cutting implement 16 in a straight orientation regardless of forces exerted against the cutting implement 16 by the seat belt 1 or other external forces. The guide path extension 23 is directly beneath, aligned with, and coextensive to the elongated slot 25 of the guide path 22. The dimensional tolerances or clearance distances between the walls of the guide path 22 and the exterior surfaces of the cutting guide 17 and cutting implement 16 are relatively small to allow for ease of movement and to also maintain the predetermined and desired pathway of the cutting implement 16 perpendicularly to the edge of and across the web of the seat belt 1. As above, these small dimensional tolerances result in a more accurate cut across the belt along the shortest possible distance.

When the handle 18 is removed from the stowed position by pulling the latch portion outward and upward, the handle 18 is in position to move the cutting implement 16 along the guide path 22 to cut through the web of the seat belt 1. With the handle 18 in the upright position, pulling force can be applied against the cutting guide 17 so that the occupant/user can pull the cutting guide 17 and attached cutting implement 16 away from the rear of the combined tool 10 along the guide path 22 toward the front of the combined tool 10. The guide path 22 has both upper and lower slots 24, 25 extending the length of the upper portion 11 to enable the connection of the handle 18 to the cutting guide 17 and the connection of the cutting guide 17 to the cutting implement 16. As the cutting implement 16 and cutting guide 17 traverse the guide path 22 and guide path extension 23, the web of the seat belt 1 is cut through creating two segments of the seat belt restraint belt resulting, generally, in the lap belt portion 2 and shoulder belt portion 3 being severed apart and remaining on either side of the combined tool 10. With the cutting and segmentation of the seat belt 1, the combined tool 10 can be disengaged from the seat belt remnants and utilized as a glass breaker tool.

Referring to FIGS. 6A, 6B and 6C, there are shown three different and alternative cutting implement 16 configurations. The first is a straight cutting edge as shown in FIG. 6A. The second is a curved cutting edge as shown in FIG. 6B. The third is a serrated cutting edge as shown in FIG. 6C. Further, the cutting implement 16 can be made from any metal alloy that resists rusting and/or other deteriorating oxidation effects in the many environments in which automotive vehicles are used. Also, the cutting implement can be made from polycarbonate or ceramic materials having a finely honed cutting blade or edge with an increased tensile (mechanical) strength that exhibit resistance to heat, water absorption and shrinkage.

The glass breaker tool 30 is housed within the lower portion 12 of the combined tool 10. See, FIG. 5. The latch portion of the handle 18 covers the retracted and/or stowed glass breaker tool 30 that can be exposed through the front of the lower portion 12 of the combined tool 10. With reference to FIGS. 5A, 5B, the glass breaker tool is shown stowed in FIG. 5A and deployed in FIG. 5B. The glass breaker tool 30 is comprised of an outer conical shape 32 atop a cylinder 33 attached to a shaft 34 that extends inward into the lower portion 12 of the combined tool 10. The glass breaker tool 30 is housed within an aperture or recess 31 in the lower portion 12 of the combined tool. The recess 31 extends inward in a shape that has similar dimensions to that of the glass breaker tool 30 to closely accommodate the shape of the glass breaker tool 30. The position of the glass breaker tool 30, stowed or deployed, is determined by a positional release in the form of cylindrical button release 36 that traverses a pathway between the stowed and deployed positions. In each of these positions, stowed and deployed, the button release 36 is urged outward into respective apertures on the outside of the lower portion 12 of the combined tool 10 that are dimensioned to accommodate the button release 36 in either the stowed or deployed positions. The button release 36 is retained in the desired position by an outward spring force exerted against the button release 36 pushing it into the round corresponding apertures on the exterior of the lower portion 12 of the combined tool 10 locking the glass breaker tool 30 into either the stowed or deployed position. When deployed, the glass breaker tool 30 is maintained in a perpendicular orientation to the front of the combined tool 10 by the cylinder 33 and the shaft 34 being retained within the shaped recess 31 such that any lateral motion is minimized. In this way the deployed glass breaker tool 30 can be employed by grasping the combined tool 10 and striking a window with the conical shaped portion 32 in order to break the glass and escape from the vehicle.

Figure 7:
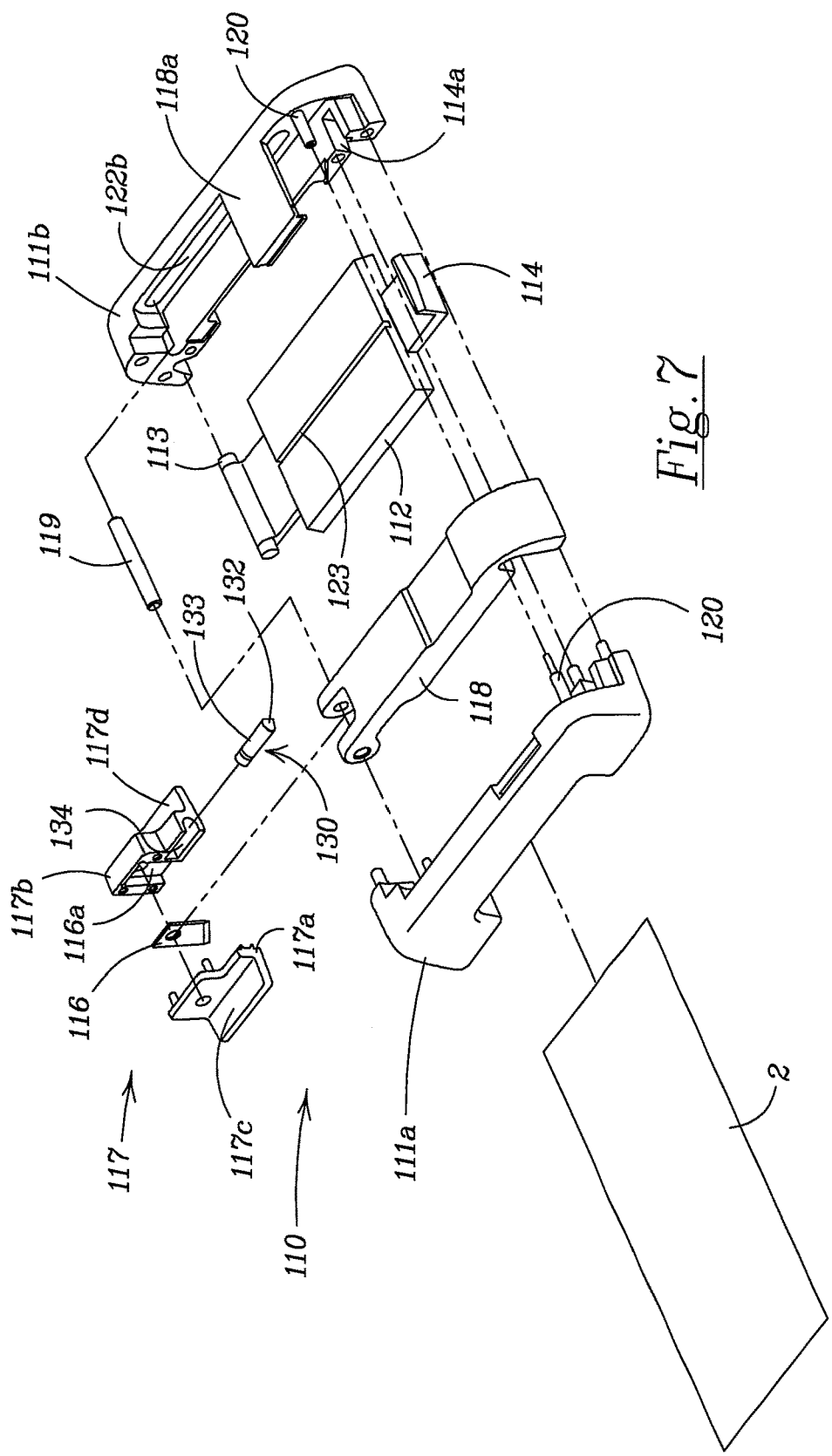
FIG. 7 is an exploded view of a second embodiment of the combined seatbelt cutter and glass break tool of the present invention.
Figure 8:
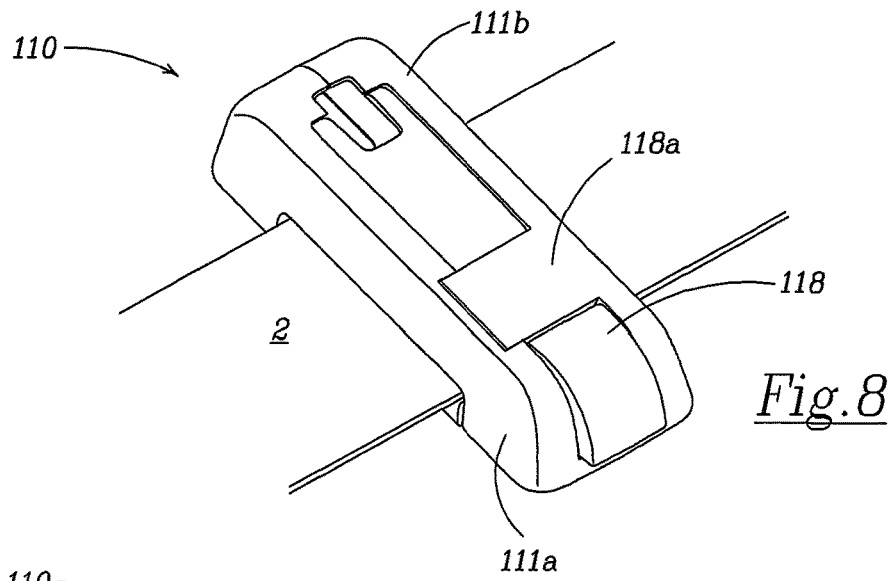
FIG. 8 is a perspective view of the second embodiment of the combined seatbelt cutter and glass break tool of the present invention installed on a seatbelt.

Referring now to FIGS. 7-10 a second embodiment of the combined seatbelt cutter and glass break tool 110 is shown. FIG. 8 shows the combined seatbelt cutter and glass break tool 110 mounted onto and around the lap portion 2 of the seat belt. This mounting is accomplished by placing the seat belt 1 between an upper portion 111*a*, 111*b* and a lower portion 112 of the combined tool 110. The two parts of the upper portion 111*a*, 111*b* are configured to fit together utilizing a plurality of pins and receivers in juxtaposed positions in each part 111*a*, 111*b* so that the pins and receivers cooperate one with the juxtaposed other to both position and attach each part 111*a*, 111*b* to the other. The pins and receivers are located at the front and rear of the parts 111*a*, 111*b* and permit a snap-together action that retains the parts in a fixed position for use. The bottom or lower portion 112 is hinged at the rear of the combined tool 110 using a pin 113 that creates a hinge point for the upper portions 111*a*, 111*b* and the lower portion 112 of the combined tool 110 to capture, in this instance, the lap portion of the seat belt 2. At the other end of the combined tool 110, distant from pin 113, there is a snap lock mechanism 114 that will retain the two portions 111, 112 of the combined tool 110 together once engaged. The snap lock mechanism 114 is shown as a tongue that is engaged into a recess 114*a* that is engaged by inserting the extended tongue located on the lower portion 112 of the combined tool 110 into a cooperating opposing receiver or recess formed between the two parts of the upper portion 111*a*, 111*b* and located on the combined upper portion 111 of the combined tool 110 to operatively engage and retain the two portions 111, 112 in immediate adjacent proximity of one to the other. This engagement of the snap lock mechanism holds the two portions 111, 112 of the combined tool 110 together in a substantially parallel alignment in both horizontal and vertical directions. This engaging of the appendage 114 within the cooperating recess 114*a* results in the seat belt 1 being surrounded and captured within the two portions 111, 112 of the combined tool 110.

Figure 9:
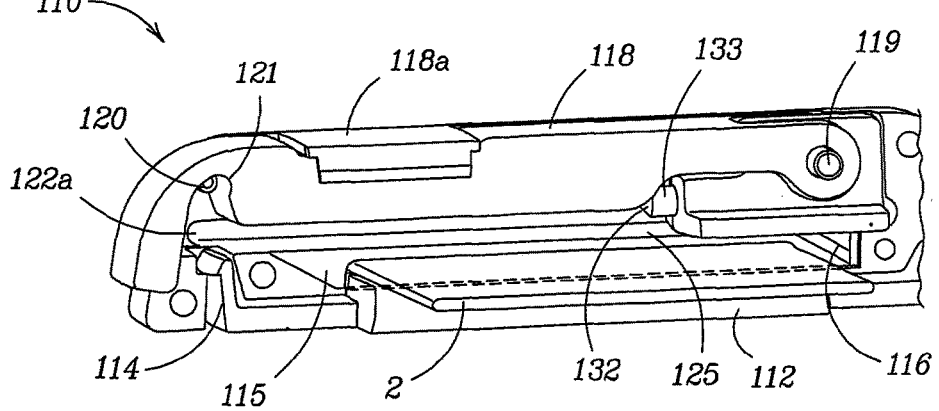
FIG. 9 is a side view of the second embodiment of the combined seatbelt cutter and glass break tool of the present invention installed on a seatbelt with the right side of the upper portion of the tool removed for ease of understanding of the internal structure of the combined tool.

As can be seen from FIG. 9, a recess 115 is provided between the upward facing side of the lower portion 112 of the combined tool 110 and the underside of the upper portion 111 having a depth substantially the same as the thickness of the seat belt 1 for capturing the seat belt 1 (in this case the lap portion 2 of the seat belt 1) between the bottom of the recess 115, i.e., the top of the lower portion 112, and the underside of the upper portion 111. The closure of the two portions 111, 112 together creates sufficient frictional contact of the combined tool 110 against the seat belt 1 to maintain the combined tool 110 in any desired position along the entirety of belt 1.

Once engaged around the seat belt 1 the combined tool 110 is still capable of being positioned into any desired location along the belt 1. However, once the upper and lower portions 111, 112 of the combined tool 110 are in engaged juxtaposition there is considerable friction between the inside surfaces of the upper and lower portions 111, 112 of the combined tool 110 and the seat belt 1. As above, although there is frictional contact, the combined tool 110 is still capable of being repositioned along the portion of the seat belt 1 onto which it was placed such that the combined tool 110 can be located or relocated into a comfortable position for use by the occupant as needed.

Attached to the upper portion 111 is handle 118 that is mounted between the two parts 111a, 111b of the upper portion 111 by pin 119 which is located at the rear of the combined tool 110. The pin 119 extends through the rear of the handle 118 and through the cutting guide 117 comprised of two parts, 117a and 117b. Between the two parts 117a, 117b is housed the cutting implement 116 which is held in position by a combination of recess 116a in part 117b of cutting guide 117, and by pin 119 that also extends through the cutting implement 116. The recess 116a creates a space within which the cutting implement 116 is restricted in any forward or rearward tilting and is sandwiched between parts 117a and the recess 116a in part 117b such that any twisting motion is substantially eliminated. Further, the passing of the pin 119 through the cutting implement 116 and the cutting guide 117 creates a fulcrum point for focusing force by the handle 118 on the cutting implement 116 and cutting guide 117. The cutting implement 116 can be of any type as described above.

The cutting guide 117, as described above, is attached to the handle 118 that can be best described as having three portions, a base portion, a gripping portion and a latch portion. The base portion of the handle 118 is attached to the cutting guide 117 at the rear end of the handle 118 by pin 119. The gripping portion of the handle 118 such that the gripping portion of the handle can be positioned in line with the combined tool 110 or at approximately a 90° position to the outer surface of the upper portion 111 of the combined tool 110 when use is contemplated. The handle 118 is retained in a stowed position by a cooperating rounded slot 121 located at the distal end of the latch portion of the handle 118 that is configured to overlie and engage with a retaining pin 120 located on the forward upper portion 111a/111b of the combined tool 110. The latch portion of the handle 118 is positioned at a 90° angle to the gripping portion of the handle 118 to overlap the top and partial front of the combined tool 110. Engagement of the rounded slot 121 with the retaining pin 120 maintains the handle 118 in the stowed position until pulled outward and upward for use in cutting through the web of the seat belt 1 by the cutting implement 116. Also used to retain the handle 118 in the stowed position is tamper indicator 118a that overlies the handle 118 extending outward from one part 111b of the upper portion 111 of the combined tool 110 such that the handle cannot be operated unless the tamper indicator 118a has been snapped off by upward movement of the handle 118 from its stowed position to its operable position. Tamper indicator 118a is shown in FIG. 7 and FIG. 9 as a rectangular extension overlying a slight indentation in the handle 118 that can be snapped off as the handle 118 is moved upward. If tamper indicator 118a is missing or detached, the user should determine whether the seat belt 1 has been compromised by a partial cutting action and replace the combined tool 110 with an unused tool. If the seat belt 1 has been compromised, the belt should also be promptly replaced.

Housed within the upper portion 111 of the combined tool 110 is the cutting implement 116 and cutting guide 117. The cutting implement 116 and cutting guide 117 are stored at the rear of the combined tool 110 within a recess that serves as a guide path for moving the cutting implement 116 within the cutting guide 117 from the rear to the front of the combined tool 110 along a predetermined pathway, which movement results in the cutting through of the web of the seat belt 1. This recess or guide path 122 extends from the rear to the front of the upper portion 111 of the combined tool 110 and is formed between each of the parts 111a and 111b. The guide path 122 is augmented by opposing paired channels 122a, 122b that cooperate with outward shoulder extensions 117c, 117d of the cutting guide 117, which extensions are configured to slide within the channels 122a, 122b to carry the cutting guide 117 and the cutting implement 116 forward within the combined cutting tool 110.

To increase the stability of the blade of the cutting implement 116, a slot 123 in the lower portion 112 guides and permits free forward travel of the cutting implement 116, which extends below the cutting guide 117 and into the slot 123. The cutting guide 117 and the attached cutting implement 116 are shown in FIG. 9 in the stowed position at the rear of the combination tool 110. In the second embodiment of the combination tool 110, the cutting implement 116 and its cutting edge are always housed within the guide path 122 of the combined tool 110 and remain completely unexposed to the exterior of the combined tool 110 once the tool is engaged onto the seat belt 1.

The recess or guide path 122 comprises an open space between the opposed channels 122a, 122b in the upper portion 112 to accommodate the overall rectangular shape of the cutting guide 117 with an elongated slot 125 extending from the rear to the front of the combined tool 110. The elongated slot 125 is created and extends between the lower support wall or floor of each of the opposed channels 122a, 122b along the sides of the recess or guide path 122. See, FIG. 9.

The cutting guide 117 is connected to and manually controlled by the handle 118 through the connection at pin 119 that extends through the cutting guide 117 and the cutting implement 116. The handle 118 can be manipulated to pull the cutting guide 117 and cutting implement 116 through the web of the seat belt 1 by moving the cutting guide 117 and cutting implement 116 from their rearward stowed position forward along the guide path 122. The seat belt 1, or the lap portion 2 of the belt 1, resides within the recess 115 between the upper and lower portions, 111a, 111b and 112, of the combined tool 110. Connecting the guide path 122 with the recess 115 is the elongated slot 125 that extends from the rear to the front of the upper portion 111, between the two parts 111a and 111b, of the combined tool 110. Extending through the elongated slot 125 is the attached cutting implement 116. There is also a guide path extension 123 of the guide path 122 in the lower portion 112 of the combined tool 110 that is used maintain the distal end of the cutting implement 116 in a straight orientation perpendicular to the plane of the web of the seat belt 1 regardless of forces exerted against the cutting implement 116 by the seat belt 1, or other external forces. The guide path extension 123 is directly beneath, aligned with, and coextensive to the elongated slot 125 of the guide path 122. The dimensional tolerances or clearance distances between the walls of opposed channels 122a, 122b of the guide path 122 and the exterior surfaces of the extensions 117c, 117d of the cutting guide 117, the spacing between the cutting guide 117 and the walls of the guide path in the upper portion 111 of the combined tool 110, and the spacing between the cutting implement 116 and the sides of the respective slots 123, 125 are relatively small to allow for ease of movement, but to also maintain the predetermined and desired pathway of the cutting implement 116 perpendicularly to the edge of and across the web of the seat belt 1. These small dimensional tolerances result in a more accurate cut across the belt along the shortest possible distance.

When the handle 118 is removed from its stowed position by pulling the latch portion outward and upward and breaking off the tamper indicator 118a, the handle 118 is in position to move the cutting implement 116 along the guide path 122 to cut through the web of the seat belt 1. With the handle 118 is in the upright position, pulling force can be applied against the cutting guide 117 so that the occupant/user can pull the cutting guide 117 and attached cutting implement 116 away from the rear of the combined tool 110 along the guide path 122 toward the front of the combined tool 110. As the cutting implement 116 and cutting guide 117 traverse the guide path 122, guide path extension 123, and elongated slot 125, the web of the seat belt 1 is cut through creating two segments of the seat belt restraint resulting, generally, in the lap belt portion 2 and shoulder belt portion 3 being severed apart and remaining on either side of the combined tool 110. With the cutting and segmentation of the seat belt 1, the combined tool 110 can be disengaged from the seat belt remnants and utilized as a glass breaker tool.

The glass breaker tool 130 is housed within the front portion of cutting guide 117 of the combined tool 10. See, FIGS. 7 and 9A. The latch portion of the handle 118 covers an opening in the front of the combined tool 110 between the front portion of the lower portion 112 and the pin 120. With the handle 118 having been used to cut the belt 1, such that the handle is folded down over the upper portion 111 of the combined tool 110 and the cutting guide 117 is positioned at the front of the combined tool 110, the retracted and/or stowed glass breaker tool 130 is exposed through the front of the lower portion 112 of the combined tool 110. The glass breaker tool 130 is shown in its stowed position in FIG. 9 and its deployed position in FIG. 9A.

Figure 9A:
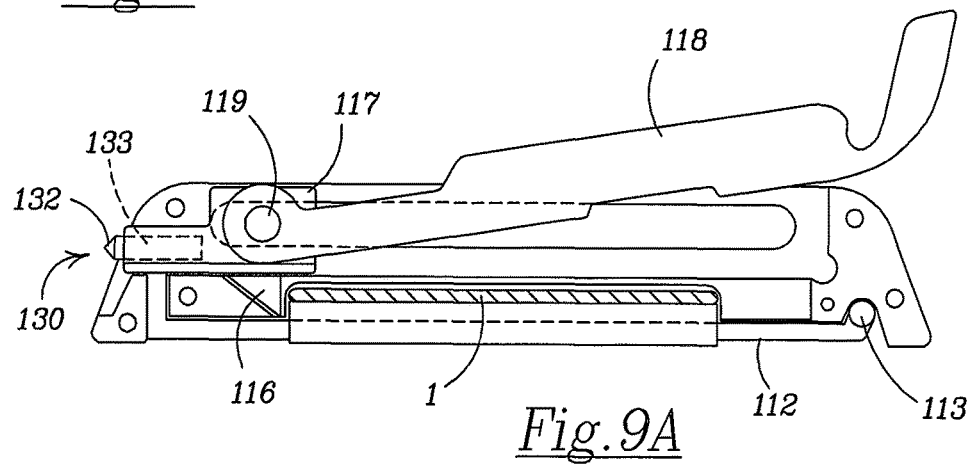
FIG. 9A is a side view of the second embodiment of the combined seatbelt cutter and glass break tool of the present invention with the glass break tool extended with the right side of the upper portion of the tool removed for ease of understanding of the internal structure of the combined tool.

The glass breaker tool 130 is comprised of a forward conical shape 132 atop a cylinder 133 and positioned within a cylindrical recess 134 that extends inward into the lower portion of the cutting guide 117 of the combined tool 110. The recess 134 extends inward into the cutting guide 117 in a shape that has similar dimensions to that of the glass breaker tool 130 to closely accommodate the inward cylindrical shape 133 of the glass breaker tool 130. The position of the glass breaker tool 130, stowed or deployed, is determined by the position of the handle 118. The handle 118 is shown in its stowed position in FIG. 9 along with the cutting guide 117 and glass break tool 130 also in the stowed positions. After cutting through the belt 1, the handle 118 is folded down over the cutting tool 110 to permit easier grasping of the combined tool 110 by the user/vehicle occupant. FIG. 9A shows the handle 118 folded over the combined tool 110 following the traversal of the guide path 122 by the cutting guide 117 and cutting implement 116 such that the glass break tool 130 is extending out the front of the combined tool 110 in its deployed position.

In the second embodiment there is no need for either a button release or any outward spring force. The glass break tool 130 is held in its deployed position by the interconnection of the handle 118 and the cutting guide 117 housing the glass break tool 130 and by depressing the handle 118 downward against the upper portion 111 of the combined tool 110. When deployed, the glass breaker tool 130 is maintained in a perpendicular orientation to the front of the combined tool 110 by the cylindrical recess 134 housing the cylindrical portion 133 of the glass break tool 130 such that any lateral or up-down motion is minimized. In this way the deployed glass breaker tool 130 can be employed by grasping the combined tool 110 and striking a window with the conical shaped portion 132 in order to break the glass and escape from the vehicle.

Figure 10:
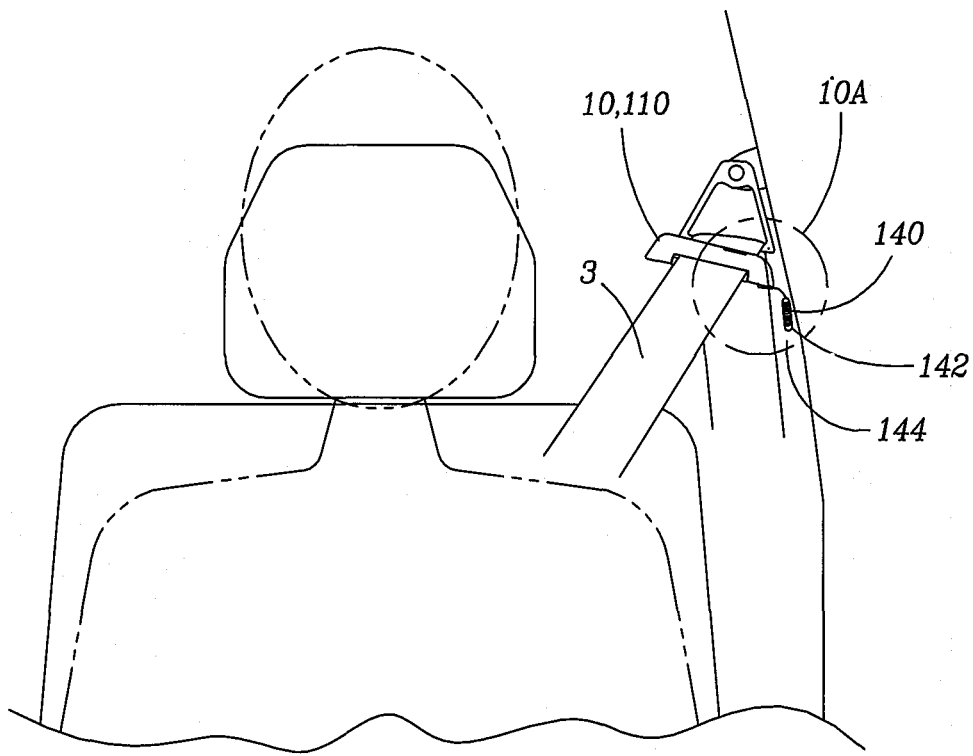
FIG. 10 is a perspective view of the second embodiment of the combined seatbelt cutter and glass break tool of the present invention installed on a seatbelt at the seatbelt guide above the shoulder of a seatbelt user.
Figure 10A:
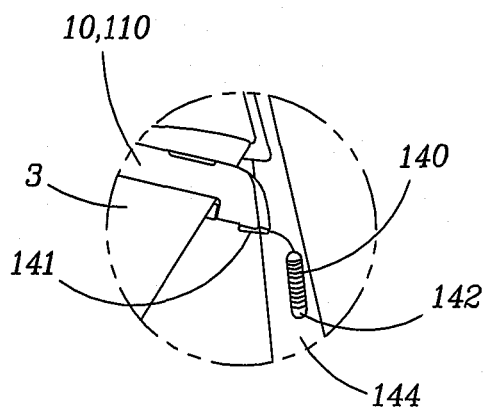
FIG. 10A is an enlargement of the circled section of FIG. 10 showing an enlargement of the strap attachment between the combination tool and a vehicle surface.
Figure 10B:
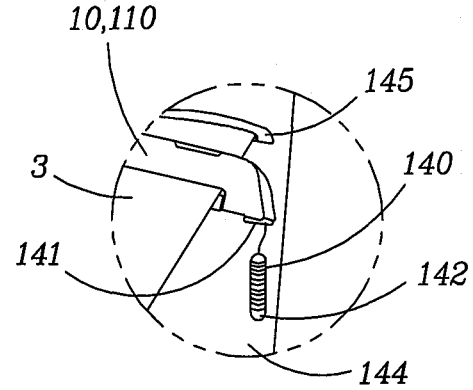
FIG. 10B is a perspective view of the strap attachment between the combination tool and a vehicle surface proximate to a slot through which the shoulder restraint of the seat belt becomes visible to a vehicle occupant.

In the case of using the combined tool 10, 110 in a position on seatbelts 1 near or where a child can tamper with the device, the combined tool 10, 110 can be positioned on the shoulder restraint portion 3 of the seat belt 1 as shown in FIG. 10. A Velcro® strap 140 extending between the combined tool 10, 110 and any flat surface near the slot through which the seat belt 1 extends from either the side or roof of the vehicle. The Velcro® strap 140 may be secured through the aperture 15, 115 of the combined tool 10, 110, or be secured to the flat underside of the combined tool 10, 110 at position 141 as shown in FIG. 10A. The other end of the strap 140 is secured to a cooperating strip 142 adhered to a flat surface 144 of the vehicle at a location proximate to the point about which the seat belt 1 extends and retracts. See, FIGS. 10, 10A. The strap 140 may also be secured to a flat surface of the vehicle proximate to a slot 145 through which the seat belt shoulder restraint portion 3 becomes vehicle to an occupant (FIG. 10B). The movement restraining strap 140 maintains the combined tool 10, 110 in close proximity to the point about which the seat belt 1 extends and retracts while not prohibiting the use of the seat belt 1. This restraining strap 140 maintains the combined tool 10, 110 at a location away from curious children while still being immediately available to an occupant or first responder to cut through the seat belt 1.

In summary, in the event of an accident where the airbags and seat belt pretensioners have been deployed resulting in the tightening of the seat belt 1, coupled with the failure of the latch 5 to release or be able to be released by the occupant of a vehicle, the combined seat belt cutter and glass break tool 10, 110, having been prepositioned on a selected portion of the seat belt 1, lap or shoulder portion, can be used to cut through the web of the seat belt 1. The cutting action is initiated by releasing the handle 18, 118 of the combined tool 10, 110, grasping the handle 18, 118 positioning it upright in a substantially perpendicular position to the remainder of the combined tool 10, 110, and pulling the handle 18, 118 forward along the guide path 22, 122 causing the cutting implement 16, 116 to cut through the web of the seat belt 1 at the location of the combined tool 10, 110. Once the seat belt 1 has been cut and the combined tool 10, 100 disengaged from the seat belt segments, the exposed glass break tool 30, 130 can be deployed and the combined tool 10, 110 grasped and used to shatter a door window if the doors of the vehicle are unusable. In this way an occupant of a vehicle can escape promptly without the need to await first responders to extricate the occupant from the vehicle.

The present invention may be embodied in other specific forms without departing from the spirit or essential attributes thereof and, accordingly, the described embodiments are to be considered in all respects as being illustrative and not restrictive, with the scope of the invention being indicated by the appended claims, rather than the foregoing detailed description, as indicating the scope of the invention as well as all modifications which may fall within a range of equivalency which are also intended to be embraced therein.

The invention claimed is:

1. A combination cutter and glass break tool for an automotive vehicle comprising:
  a housing comprised of first and second side sections, a bottom section and a handle section, said first and second sections capable of attaching to each other and having a recess dimensioned to permit a vehicle safety restraint system belt be positioned between the bottom of the attached first and second sections and the bottom section and frictionally maintain the position of the tool on a captured portion of the safety belt;

said handle section connected at a rear portion of both the first and second sections by a pin extending through the handle section and captured by both the first and second sections and further connected to a cutting guide by said pin extending through the cutting guide, said pin permitting the handle section to move from a stowed to an operational position, said handle section being maintained in the stowed position by a retaining means;

said first and second sections housing therebetween in an elongated space a cutting implement attached to said cutting guide for severing the safety belt captured between the said sections, said cutting guide being located within a guiding track for maintaining the cutting guide and the attached cutting implement in substantially perpendicular alignment to said captured safety belt, said guiding track extending within the elongated space between the first and second sections from rear to front and having both upwardly and downwardly opening slots, said downwardly opening slot permitting a forward sliding of the cutting implement and the upwardly opening slot permitting the attachment of the cutting guide to said handle section for operating the cutting implement attached to the cutting guide;

said cutting guide can be in a stowed first position or a second deployed position as controlled by said handle section and also housing a glass break tool on its forward facing portion with the position of the glass break tool dependent upon the position of the cutting guide, with the glass break tool in its deployed position only following the severing of the safety belt by the cutting implement and with the handle section overlying the first and second sections forming a gripping position, whereby said combination cutter and glass break tool is readily available for use by being retained in position on the safety restraint system of a vehicle.

2. The combination cutter and glass break tool of claim 1, wherein said retaining means for maintaining the handle section in the stowed position being a mating recess and a bar located on an inside surface of the handle section and inside a forward portion of the attached first and second sections, respectively.

3. The combination cutter and glass break tool of claim 1 additionally comprising a strap extending between said combination tool and a flat surface of said vehicle proximate to a slot for guiding the extension and retraction of said safety belt for maintaining said combination tool at a location adjacent to said slot for guiding the extension and retraction of said safety belt.

4. The combination cutter and glass break tool of claim 1 additionally comprising a tamper indicator in the form of a tab extending over the handle section from either the first or the second section that, when said tab is broken or missing, indicates that the combination tool may have been used.

* * * * *